United States Patent [19]

Nishioka et al.

[11] 3,980,999

[45] Sept. 14, 1976

[54] ARRANGEMENT FOR DETECTING RELATIVE ANGULAR MOVEMENT OF A STEERING WHEEL

[75] Inventors: Tetsuji Nishioka; Takayuki Yanagishima, both of Yokohama, Japan

[73] Assignee: Nissan Motor Co., Ltd., Yokohama, Japan

[22] Filed: Aug. 20, 1975

[21] Appl. No.: 666,277

[30] Foreign Application Priority Data

Aug. 26, 1974 Japan............................ 49-97689

[52] U.S. Cl............................ 340/279; 180/99; 340/52 R
[51] Int. Cl.²........................................ G08B 21/00
[58] Field of Search............... 340/52 R, 52 D, 53, 340/279, 271; 180/99

[56] References Cited
UNITED STATES PATENTS

| | | | |
|---|---|---|---|
| 3,106,981 | 10/1963 | Chakiris | 340/53 |
| 3,559,205 | 1/1971 | Colby | 340/52 R |
| 3,594,772 | 7/1971 | Setser | 340/52 R |
| 3,654,599 | 4/1972 | Sepper | 340/52 R |
| 3,678,494 | 7/1972 | Setser | 340/52 R |
| 3,877,541 | 4/1975 | Takeuchi et al. | 340/279 |

*Primary Examiner*—Glen R. Swann, III
*Attorney, Agent, or Firm*—Frank J. Jordan

[57] ABSTRACT

The steering movement of a motor vehicle is translated into an electrical signal which increases as the steering wheel rotates in one direction and decreases as the steering operation is reversed. This signal is applied to a minimum value detecting and storage circuit and a maximum value detecting and storage circuit, each including a storage capacitor, a switching diode for controlling the charge or discharge of the capacitor, and a bypass switching circuit connected across the diode. The diode of the minimum detector is connected such that it allows the capacitor to be discharged, while the diode of the maximum detector allows the capacitor to be charged. The bypass switching circuit of the minimum detector provides a charging path to the capacitor, while the bypass circuit of the maximum detector provides a discharging path to the capacitor. The voltages developed across the two capacitors are measured and compared with a reference voltage. A reset signal will be produced when the difference voltage exceeds the reference voltage. The reset signal is used to operate the two bypass switching circuits simultaneously to reset either of the stored values depending upon the instantaneous values of the electrical signal.

6 Claims, 5 Drawing Figures

ARRANGEMENT FOR DETECTING RELATIVE ANGULAR MOVEMENT OF A STEERING WHEEL

BACKGROUND OF THE INVENTION

The present invention relates generally to safety apparatus for a motor vehicle and in particular to a steering movement detector which detects the relative angular movement of the steering movements.

Vehicle safety apparatus are designed to alert vehicle occupant whenever a prolonged absence of steering operation is detected during normal driving condition. To detect the steering movements prior art devices have been designed to detect the angular displacement of a steering wheel from the neutral or absolute position and provides a clear signal indicating that the driver is active in steering operation whenever the displacement exceeds a predetermined fixed value. However, undesirable consequences might occur when a vehicle is driven along a roadway which is inclined sideways or when it encounters a strong transverse wind, because in such circumstances the driver will make an attempt to steer the vehicle to go straight by compensating for any departure from the intended path. In such circumstances steering movements can occur in the neighborhood of the set point of detection so that false clear signals will be produced by inconsequential steering movements.

SUMMARY OF THE INVENTION

The primary object of the present invention is therefore to provide an improved steering movement detector which detects the relative angular movement of the steering wheel of a motor vehicle.

Another object is to provide an improved steering movement detector which includes a minimum value detector and storage circuit and a maximum value detector and storage circuit, and a differential amplifier to measure the difference between the stored minimum and maximum values to represent the relative angular displacement of the steering wheel.

In accordance with the present invention, the steering movements of a motor vehicle are translated into an electrical signal which increases in voltage as the steering wheel rotates in one direction and decreases as the steering is reversed. The signal represents the angular position of the steering wheel with respect to an arbitrary reference point. A minimum value detector is provided having a first storage capacitor, a first diode connected between the translator and the capacitor in a backward direction as seen from the translator side, and a first switching circuit connected across the diode to permit the voltage developed in reverse direction across the diode to flow into the capacitor. Also provided is a maximum value detector which includes a second storage capacitor, a second diode connected between the translator and the second capacitor to permit the capacitor to be charged by the forward bias voltage of the second diode, and a second switching circuit connected across the second diode to discharge the capacitor by an amount proportional to the backward bias voltage of the second diode. The minimum and maximum detectors are connected to the translator to receive the electrical signal and deliver a minimum and a maximum voltage to a differential amplifier which measures the difference therebetween. The voltage difference thus represents the angular displacement of the steering wheel from the previous position and is used to clear a timing circuit of a vehicle safety apparatus and to operate the first and second switching circuits to complete their circuits simultaneously either to charge the first capacitor or discharge the second capacitor depending on the instantaneous value of the electrical signal at the time of occurrence of the clear signal.

BRIEF DESCRIPTION OF THE DRAWINGS

These and other objects and features of the invention will be understood from the following description taken in conjunction with the accompanying drawings, in which.

DESCRIPTION OF THE PREFERRED EMBODIMENT

Figure 1:
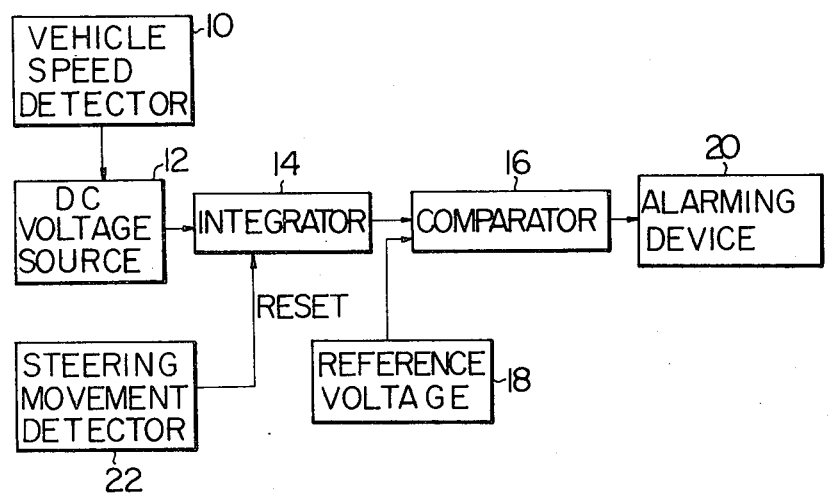
FIG. 1 is a schematic circuit diagram of a safety apparatus of the invention.

Referring now to FIG. 1 which illustrates a circuit diagram of a vehicle safety apparatus embodying an improved steering movement detector of the invention. The safety apparatus includes a vehicle speed detector 10 which detects the vehicle speed and signals a d-c voltage source 12 to apply a constant unidirectional voltage to an integrator circuit 14 when the vehicle reaches a predetermined speed. The integrator 14, which may comprise an operational integrator amplifier, develops an output voltage rising exponentially with time. This voltage is applied to a comparator 16 in which it is compared with a reference voltage supplied from a source 18. When the rising voltage exceeds the reference voltage, the comparator 16 provides an alarm signal to an alarming device 20 to issue a sound or visual signal to alert the vehicle driver. A steering movement detector 22 is provided to detect the time when steering movement occurs and clears the stored charge in the integrater 14 by a suitable discharge circuit (not shown).

Figure 2:
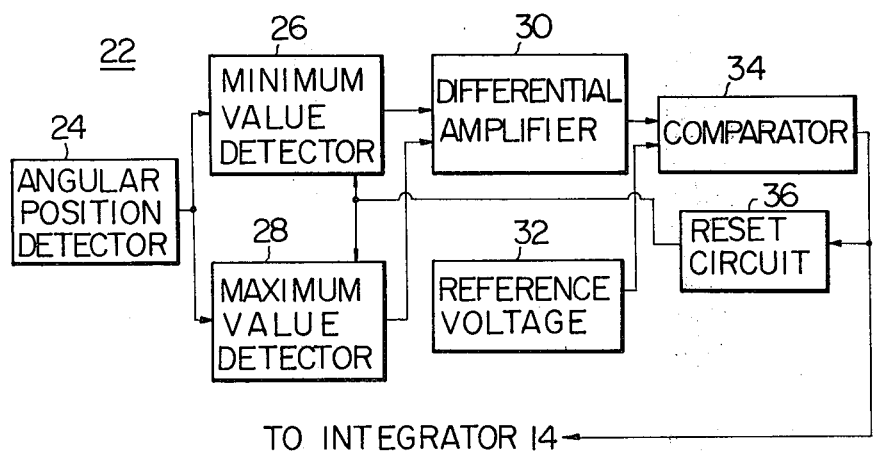
FIG. 2 is a schematic circuit diagram of a steering movement detector of the invention.

In accordance with the present invention, the steering movement detector 22 comprises, as shown in FIG. 2, an angular position detector 24 which translates the angular position of the steering wheel into a proportional electrical signal, a minimum value detector 26, a maximum value detector 28 coupled in parallel circuit relation with the minimum detector 26 to the output of angular position detector 24, a differential amplifier 30, which receives the outputs from the two detectors 26, 28 and provides an output to a comparator 34 to which is also applied a reference voltage supplied from a source 32, and a reset circuit 36 coupled to the output of comparator 34, the comparator output being connected to the integrator 14.

Figure 3:
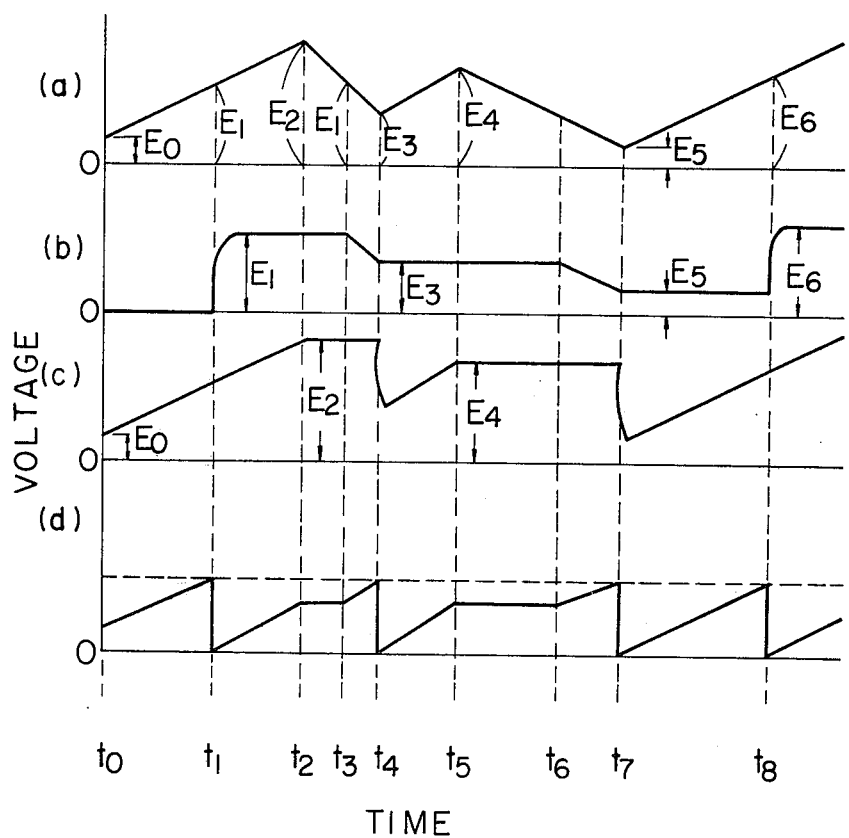
FIG. 3 is a waveform diagram with reference to the steering movement detector of FIG. 2.

The actual operation of the circuit of FIG. 2 will be explained with reference to the waveforms shown in FIG. 3. The angular position detector or transducer 24 produces an increasing and decreasing voltage waveform shown at FIG. 3a in accordance with the steering movements. The detector 24 may be any of the type which comprises a potentiometer (not shown) coupled to the steering column of the vehicle for unitary rotation and having its opposite end terminals connected to the positive and negative terminals of a DC voltage source (not shown). An output voltage is derived from the tap point of the potentiometer and one of the terminals thereof. The voltage output from the angular position transducer 24 is thus representative of an absolute angular position of the steering wheel with respect to a reference point which may be either one of the extreme ends of the steering rotation.

During time interval $t_0$ to $t_1$, the transducer output increases from voltages $E_0$ to $E_1$ and the maximum detector 28 delivers an increasing voltage (FIG. 3c) while the minimum detector 26 delivers no voltage. The differential amplifier 30 provides a difference signal. The difference voltage is coupled to the comparator 34 which compares it with a predetermined voltage supplied from source 32 and delivers a reset signal when the predetermined voltage is reached at time $t_1$. The reset signal is used to clear the integrator 14, while allowing the minimum detector 26 to provide an output voltage $E_1$ which is the instantaneous voltage of the input waveform at time $t_1$. The minimum detector 26 will maintain its voltage until the input voltage falls below $E_1$ at time $t_3$. At time $t_2$, a maximum voltage occurs in the input waveform. The maximum detector 28 detects the maximum value and holds it for time duration $t_2$ to $t_4$ during which input voltage declines. When the input voltage falls below voltage level $E_1$, the minimum detector 26 produces a decreasing voltage which follows the voltage envelope of the input waveform. At time $t_4$, the minimum detector 26 detects a minimum value of the input voltage and holds it until the incoming voltage falls below the stored voltage.

It will be noted that the minimum detector 26 functions to detect a decreasing voltage to store a minimum point of the voltage upon the rise of the input voltage, and the maximum detector 28 also functions to detect an increasing voltage to store a maximum point of the input voltage. Either one of the detectors 26, 28 is reset to a new input value when the difference between the output from the detectors 26, 28 reaches a predetermined level, depending on the input voltage; if the input voltage is lower than the stored maximum level the maximum detector output will be reset to the new input level, while if the input voltage is higher than the stored minimum level the minimum detector output will be reset to the new input level.

The integrator 14 will thus be cleared at intervals determined by the relative displacement of the steering movement represented by the voltage difference between the outputs from the minimum and maximum detectors 26 and 28.

Figure 4:
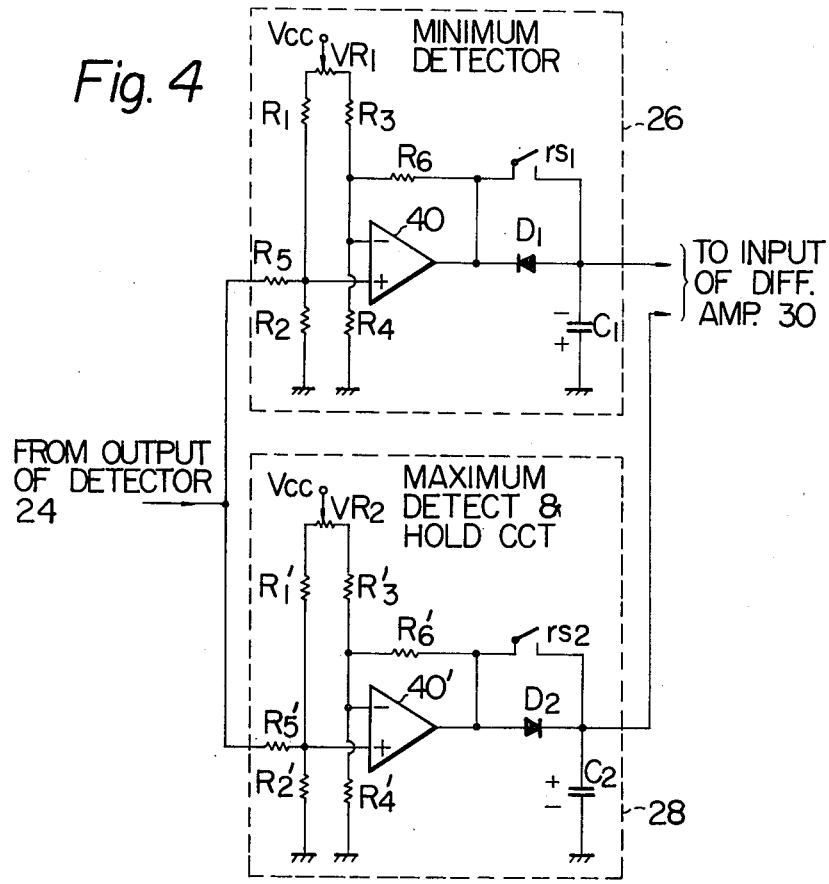
FIG. 4 is a circuit diagram of a minimum value detector and a maximum value detector of the steering movement detector of FIG. 2.

One example of the circuitry required to perform the functions of the maximum and minimum detectors 26 and 28 is shown in FIG. 4.

The minimum detector 26 comprises a differential amplifier 40, and a voltage dividing network including series-connected resistors R1 and R2 and second series-connected resistors R3 and R4, each of the series resistor circuits being connected in common to a DC voltage source Vcc via a variable resistor VR1. The resistors R1 and R2 have equal resistances, the resistors R3 and R4 having also an equal resistance value. The positive and negative input terminals of amplifier 40 are connected to the point of interconnection between resistors R1 and R2 and the point of interconnection between resistors R3 and R4, respectively. Thus, the two input terminals of amplifier 40 are held at the same DC potential which may be achieved by adjustment of the variable resistor VR1. Between the output terminal and the negative input terminal of amplifier 40 is connected a feedback resistor R6 so that the negative input terminal is substantially at the same DC potential as at the output terminal. On the other hand, the positive input terminal is further connected to the output of angular position transducer 24. The amplifier 40 delivers an output which represents the difference between the two input voltages, which difference voltage is fed back to the negative input terminal until the same potential develops at the output and the negative input terminals as at the positive input terminal.

Figure 5:
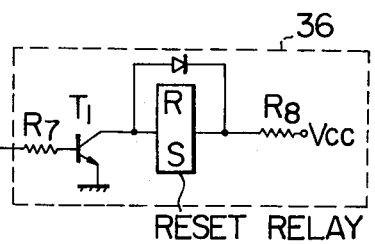
FIG. 5 is a circuit diagram of a reset circuit of FIG. 2.

The minimum detector 26 is further provided with a diode D1 having its cathode terminal connected to the output of amplifier 40 and its anode terminal connected to the differential amplifier 30 and a storage capacitor C1 connected across the anode terminal of diode D1 and ground. The diode D1 is shunted by contact $rs1$ which is a normally open contact of a relay RS provided in the reset circuit 36 shown in FIG. 5. The reset circuit 36 comprises an amplifying transistor T1 having its base electrode connected via an input resistor R7 to the output of comparator 34 and its emitter connected to ground. The reset relay RS has its one end connected to ground via the collector-emitter path of the transistor T1 and the other end connected to a DC voltage source Vcc via a current limiting resistor R8.

The maximum detector 28 comprises a similar circuit configuration to the minimum detector 26 except that diode D2 has its cathode terminal connected to the output circuit of the maximum detector 28 and its anode terminal connected to the output of amplifier 40'. The diode D2 is shunted by contact $rs2$ which is the other normally open contact of the relay RS so that diodes D1 and D2 are simultaneously short-circuited by the respectively relay contacts.

During the time period $t_0$ to $t_1$ the voltage at the output of angular position detector 24 increases from voltage $E_0$ to $E_1$. The potential at the output of amplifiers 40 and 40' increases correspondingly to charge the capacitor C2 through diode D2 until the voltage thereacross reaches $E_1$, while diode D1 of the minimum detector 26 prevents the capacitor C1 from being charged. The maximum detector 28 thus delivers an increasing voltage (FIG. 3c), while the minimum detector 26 delivers no voltage output (FIG. 3b). At time $t_1$, the difference between the two outputs from the detectors 26 and 28 reaches a predetermined voltage and comparator 34 provides an output which drives the relay RS of the reset circuit 36, thus closing its contacts $rs1$ and $rs2$. The closure of contact $rs1$ provides a path for charging the capacitor C1 to voltage $E_1$, while the closure of contact $rs2$ has no effect on the maximum detector 28. The output of minimum detector 26 rises to voltage $E_1$ and the difference between the output from the two detectors reduces to zero (FIG. 3d). Upon the lowering of the potential difference at time $t_1$, the comparator 34 removes its output to thereby release the relay RS.

During the time period $t_1$ to $t_2$, the diode D1 of the minimum detector 26 prevents the increasing voltage at the output of amplifier 40 due to the increase of voltages from $E_1$ to $E_2$ from charging the capacitor C1, so that the charge stored in capacitor C1 will be maintained at a substantially constant voltage. The increasing input voltage has meanwhile charged the capacitor C2 of maximum detector 28 through diode D2 to voltage $E_2$.

During the time interval $t_2$ to $t_4$, the input voltage decreases from $E_2$ to $E_3$ and the potential at the output of amplifiers 40 and 40' also decreases. The potential across the capacitor C1 will decrease when the potential at the output of amplifier 40 decreases below voltage $E_1$ at time $t_3$ because diode D1 switches to the conductive state allowing the capacitor C1 to discharge its stored energy through diode D1, resistors R6 and R4 to ground. The discharge will continue until time $t_4$ whereupon the input voltage starts to rise again, causing diode D1 to turn off. The voltage decrease during this time period turns off diode D2 of maximum detector 28, thereby resulting in a constant voltage $E_2$ at the output of maximum detector 28. At time $t_4$, the voltage difference between the two outputs from the detectors 26, 28 reaches the predetermined level and the reset relay RS will be operated. This provides a discharge path for the capacitor C2 since the voltage it develops is higher than the voltage at the output of amplifier 40', thus lowering the voltage across the capacitor C2 to $E_3$.

During times $t_4$ to $t_5$ the input voltage is on the increase and the diode D2 will be turned on to charge the capacitor C2 to voltage $E_4$ which is obtained at time $t_5$, while the diode D1 will remain turned off to prevent capacitor C1 from being discharged.

With a decreasing input voltage during the interval between $t_5$ and $t_6$, the diode D2 will be turned off allowing capacitor C2 to maintain its stored charge and the diode D1 will continue its turn-off state until the voltage at the output of amplifier 40 becomes lower than the voltage $E_3$ at time $t_6$. With the input voltage still decreasing during the interval between $t_6$ and $t_7$, the voltage at the output of amplifier 40 decreases below voltage $E_3$ and causes diode D1 to turn on to discharge the capacitor C1 to voltage $E_5$ which occurs at time $t_7$, while the voltage across the capacitor C2 will be maintained constant. At time $t_7$, the reset relay is operated again to discharge the capacitor C2 to the voltage level $E_5$.

An increasing input voltage during times $t_7$ to $t_8$ will cause the capacitor C1 to maintain its stored charge at voltage $E_5$, while allowing the capacitor C2 to be charged through diode D2 with the increasing voltage (FIG. 3c). The reset relay RS is operated again at time $t_8$ to allow the capacitor C1 to be charged again (FIG. 3b).

It will be noted that in the minimum detector and storage circuit 26 the relay contact rs1 serves as a path for charging the capacitor C1 by an amount proportional to the voltage developed in the backward direction across the diode D1 and the diode D1 serves as a path for discharging the capacitor C1 by an amount proportional to the voltage developed across the diode D1 in the forward direction, and that in the maximum detector and storage circuit 28 the diode D2 serves the function of charging the storage capacitor C2 by an amount proportional to the voltage developed across the diode D2 in forward direction and the relay contact rs2 serves as a path for discharging the capacitor C2 by an amount proportional to the voltage developed across the diode D2 in the backward direction.

The difference between the voltages developed across the capacitors C1 and C2 is measured by the differential amplifier 30 and this difference signal represents the relative angular movement of the steering wheel. The difference signal upon exceeding a predetermined value will cancel the increasing charge being stored in the integrator 14.

The foregoing description shows only a preferred embodiment of the present invention. Various modifications are apparent to those skilled in the art without departing from the scope of the present invention which is only limited by the appended claims. Therefore, the embodiment shown and described are only illustrative, not restrictive.

What is claimed is:

1. Arrangement for detecting the relative angular movement of the steering wheel of a motor vehicle, comprising:
    a transducer for translating the angular position of said steering wheel into an electrical signal of correspondingly varying voltage;
    first means responsive to a decreasing portion of said electrical signal for detecting the minimum voltage of said decreasing portion and storing the electrical signal at the detected minimum voltage;
    second means responsive to an increasing portion of said electrical signal for detecting the maximum voltage of said increasing portion and storing the electrical signal at the detected maximum voltage;
    means for detecting the difference between the stored signals at the minimum and maximum voltages;
    means for comparing said difference with a reference value to provide an output when said difference reaches the reference value; and
    means responsive to said output for resetting the voltage of the stored electrical signals to the instantaneous value of said electrical signal at the instant of occurrence of said output.

2. Arrangement according to claim 1, wherein the resetting means increases the voltage of the signal stored in said first means when the same is smaller than said instantaneous value and decreases the voltage of the signal stored in said second means when the same is greater than said instantaneous value.

3. Arrangement for detecting the relative angular movement of the steering wheel of a motor vehicle, comprising:
    a transducer for translating the angular position of said steering wheel into an electrical signal of correspondingly varying voltage;
    a minimum detector including a first storage capacitor, a first diode connected between the transducer and the first storage capacitor, and a first bypass circuit which, when completed, provides a short circuit across the diode, whereby the first storage capacitor is charged by said electrical signal through said bypass circuit and discharged through said diode;
    a maximum detector including a second storage capacitor, a second diode connected between the transducer and the second storage capacitor, and a second bypass circuit which, when completed, provides a short circuit across the second diode, whereby the second storage capacitor is charged by said electrical signal through said second diode and discharged through said second bypass circuit;
    means connected to said minimum and maximum detectors for detecting the diffence in voltage between the charges stored in said first and second storage capacitors;

means for comparing said difference with a reference value to provide an output when said difference reaches the reference value; and means responsive to said output for completing said first and second bypass circuits thereby providing a short circuit across each of the first and second diodes.

4. Arrangement according to claim 3, wherein said minimum detector includes a differential amplifier having a first and a second input terminal and an output terminal, a feedback circuit connected between said output and second terminals, a resistor network connected to a DC voltage source for providing an equal DC potential to said first and second input terminals, said first input terminal being connected to said transducer to receive said electrical signal and said first diode being connected at its anode electrode to the output terminal of said differential amplifier.

5. Arrangement according to claim 3, wherein said maximum detector includes a differential amplifier having a first and a second input terminal and an output terminal, a feedback circuit connected between said output and second terminals, a resistor network connected to a DC voltage source for providing an equal DC potential to said first and second terminals, said first input terminal being connected to said transducer to receive said electrical signal and said second diode being connected at its cathode electrode to the output terminal of said differential amplifier.

6. In a safety apparatus for a motor vehicle including a detector for detecting the movements of the steering wheel of the vehicle and means responsive to the detection of the steering movements for measuring the interval between successive steering movements, and means for alerting the vehicle driver when said interval is in excess of a predetermined interval, said detector comprising:

means for translating the direction of rotation of the steering wheel to provide a corresponding electrical signal which increases when the steering wheel rotates in one direction and decreases when the steering wheel rotates in the opposite direction;

means for storing a minimum value of said electrical signal including a first storage capacitor, a first switching circuit connected between the translating means and the first capacitor which, when operated, provides a path for charging said capacitor with the electrical signal, and a first diode connected between the translating means and said capacitor to discharge the same by an amount proportional to the voltage difference across said diode;

means for storing a maximum value of said electrical signal including a second storage capacitor, a second diode connected between the translating means and the second capacitor to charge the same by an amount proportional to the voltage difference therebetween, and a second switching circuit connected across said second diode which, when operated, discharges said second capacitor by an amount proportional to the voltage developed across the second diode;

means connected to said first and second storage capacitors for detecting the difference between the voltages developed across said capacitors;

means for comparing the voltage difference with a predetermined value to provide an output when said voltage difference reaches the predetermined value and;

means for operating said first and second switching circuits simultaneously in response to said output.

* * * * *

UNITED STATES PATENT AND TRADEMARK OFFICE
CERTIFICATE OF CORRECTION

PATENT NO. : 3,980,999
DATED : September 14, 1976
INVENTOR(S) : Tetsuji NISHIOKA and Takayuki YANAGISHIMA It is certified that error appears in the above–identified patent and that said Letters Patent are hereby corrected as shown below:

In the heading change the Serial No. from "666,277" to --606,277--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*